(12) United States Patent
Sarofim et al.

(10) Patent No.: US 7,666,664 B2
(45) Date of Patent: Feb. 23, 2010

(54) INSTRUMENT FOR HEATING AND COOLING

(75) Inventors: Emad Sarofim, Hagendorn (CH); Goran Savatic, Kuessnacht am Rigi (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 301 days.

(21) Appl. No.: 11/777,203

(22) Filed: Jul. 12, 2007

(65) Prior Publication Data

US 2008/0014615 A1    Jan. 17, 2008

(30) Foreign Application Priority Data

Jul. 14, 2006    (EP) .................................. 06014674

(51) Int. Cl.
*C12M 1/34* (2006.01)
*C12M 3/00* (2006.01)

(52) U.S. Cl. ..................... 435/287.2; 435/6; 435/287.1; 435/287.3; 435/303.1

(58) Field of Classification Search ..................... 435/6, 435/287.1–287.3, 303.1, 809
See application file for complete search history.

(56) References Cited

U.S. PATENT DOCUMENTS

| 6,300,124 | B1 | 10/2001 | Blumenfeld et al. |
| 6,428,749 | B1 * | 8/2002 | Kajiyama et al. ........... 422/68.1 |
| 6,509,186 | B1 * | 1/2003 | Zou et al. ................. 435/286.1 |
| 6,572,830 | B1 * | 6/2003 | Burdon et al. ......... 422/186.29 |
| 6,633,785 | B1 | 10/2003 | Kasahara et al. |
| 7,189,367 | B2 * | 3/2007 | Yamamoto et al. ........... 422/100 |
| 7,244,913 | B2 * | 7/2007 | Murakami et al. ........... 219/385 |
| 7,473,030 | B2 * | 1/2009 | Bruce et al. .................... 374/31 |
| 2003/0008286 | A1 | 1/2003 | Zou et al. |
| 2005/0282221 | A1 * | 12/2005 | Barlocchi et al. ............... 435/6 |
| 2007/0295705 | A1 * | 12/2007 | Geisbauer ................... 219/162 |

FOREIGN PATENT DOCUMENTS

| EP | 1-123739 A1 | 8/2001 |
| EP | 1-314472 A1 | 5/2003 |
| EP | 1-541237 A2 | 6/2005 |
| WO | WO 98/38487 A2 | 9/1998 |
| WO | WO 03/031063 A2 | 4/2003 |
| WO | WO 03/075111 A1 | 9/2003 |
| WO | WO 2005/115624 A1 | 12/2005 |

* cited by examiner

*Primary Examiner*—Walther D Griffin
*Assistant Examiner*—Shanta G Doe
(74) *Attorney, Agent, or Firm*—Townsend and Townsend and Crew LLP

(57) ABSTRACT

An instrument and method is provided that conveniently allows rapid amplification of nucleic acids. The instrument comprises in the following order at least one substantially flat temperature sensor element; a heat conducting substrate and a heater layer, whereby the heat conducting substrate comprises one or more channels permeable for fluid.

17 Claims, 4 Drawing Sheets

Homogenous cooling

Focused cooling

INSTRUMENT FOR HEATING AND COOLING

CROSS-REFERENCES TO RELATED APPLICATIONS

The present application claims the benefit of EP Appl. No. 06014674, filed Jul. 14, 2006, the entire contents of which is hereby incorporated herein by reference in its entirety.

FIELD OF THE INVENTION

Subject of the present invention is an instrument for heating and cooling an object in a controlled manner, a method for conducting a thermal profile, a method for amplifying nucleic acids, a system for heating a liquid and a system for determining nucleic acids.

BACKGROUND OF THE INVENTION

The invention is useful in the field of health care, where reliable analysis of samples for components contained therein is needed. Chemical reactions needing heating are well known, for example from molecular diagnostics, where nucleic acids are known to denature, i.e., to become single stranded from a hybrid of two strands, by applying heat above the melting temperature of the hybrid.

A method that uses reactions cycles including such denaturation step is the polymerase chain reaction (PCR). This technology has revolutionized the field of nucleic acid treatment, particularly the analysis of nucleic acids, by providing a tool to increase the amount of nucleic acids of a particular sequence from negligible to detectable amounts. PCR is described in EP 0 201 184 and EP 0 200 362.

An instrument for performing thermocycles in controlled manner on samples in tubes using heating and cooling an extended metal block is disclosed in EP 236069.

Heating of PCR mixtures is presently mainly done using Peltier elements with active heating and cooling. Those require complex electronics compared to systems with active heating and passive cooling.

In U.S. Pat. No. 6,633,785 there is described a method for heating a micro-tube using either resistance heating or inductive heating.

In U.S. Pat. No. 6,602,473 there is disclosed a microfabricated reaction chamber made from silicon. The device has inlet and outlet ports and can be used to conduct PCR reactions when inserted into an instrument. The system does, however, not allow sensitive and quick temperature control.

In WO 98/39487 there is described an apparatus for holding a device having a chamber, said apparatus comprising heating or cooling plates arranged on opposite side walls of a flat device in case the device is inserted into said apparatus.

The temperature changes provided by the prior art instruments were relatively slow. Thus, there was a need to provide faster temperature changes in fluids, particularly during amplification of nucleic acids.

BRIEF SUMMARY OF THE INVENTION

A first subject of the invention is an instrument for heating and cooling an object in a controlled manner, said instrument comprising layered on top of another in the following order from top to bottom a substantially flat temperature sensor element,
a heat conducting substrate, and
a heater layer, wherein said heat conducting substrate comprises one or more channels permeable for a fluid.

A second subject of the invention is a method for conducting a thermal profile in a device comprising heating the device in an instrument according to according to the invention.

A third subject of the invention is a system for determining a nucleic acid in a sample comprising an instrument according to the invention and a device containing said sample, wherein said instrument is in physical contact with said device during the determination of said nucleic acid in said sample.

A fourth subject of the invention is a method for amplification of nucleic acids comprising
a) providing a sample containing the nucleic acids in a device,
b) bringing said device in physical contact with an instrument according to the invention described herein, and
c) subjecting said sample in said device to thermocycles.

A fifth subject of the invention is a system for heating a mixture containing
a device containing one or more chambers for containing said mixture, and
an instrument according to the invention, wherein said device is in physical contact with said instrument during heating said mixture.

DETAILED DESCRIPTION OF THE INVENTION

Figure 1:
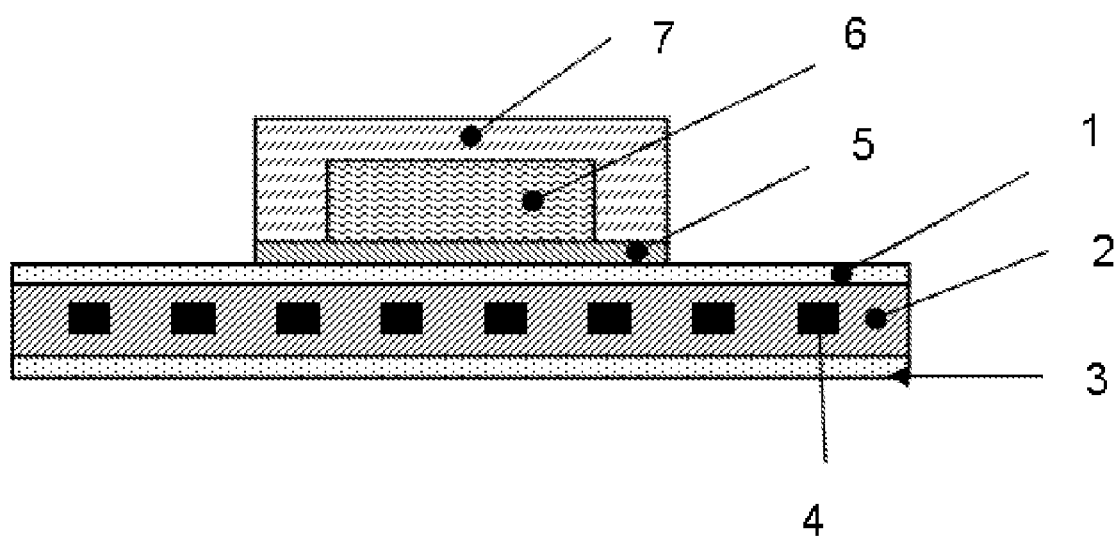
FIG. 1 shows an exemplary schematic assembly of an instrument according to the invention. The reference numerals are as follows: temperature sensor element (1); substrate (2); heater layer (3); fluid channels (4); heat conducting sealing foil (5); reaction chamber (6); body of the device (7).

Methods for the amplification of nucleic acids are known. They are intended to create a large amount of nucleic acids based upon the initial presence of a target nucleic acid serving as a template for the activity of an enzyme capable of replicating a sequence of bases within said target nucleic acid. The replicon itself is used as a target for a replication of a sequence, for example, the sequence of bases that were already subject of the first replication. Thus, a huge number of nucleic acids having an identical sequence are created. This allows very sensitive detection of the target nucleic acid.

A well established method for the amplification of nucleic acids is the polymerase chain reaction (PCR) method as disclosed in EP 200362. In this method, a reaction mixture is subjected to a repeated cycle of thermal profiles, the temperatures being adapted to effect annealing primers to the target nucleic acid, extending said annealed primer using said target nucleic acid as a template and separating the extension product from its template.

In a first step, a liquid containing the nucleic acids is provided. The liquid may be any liquid that contains a nucleic acid to be amplified. Furthermore, this liquid contains the reagents necessary for the amplification of the nucleic acids. Those reagents are well known for each amplification method and optionally include an agent for extending a primer, for example, a template dependent DNA- or RNA-polymerase and building blocks that should be attached to the primer for extension, e.g., nucleotides. Furthermore, the mixture will contain reagents useful to establish conditions for the extension reaction, like buffers and cofactors, e.g., salts, of the enzyme used.

In further steps, the temperature is adjusted to allow for denaturation of double stranded nucleic acids, annealing of primers to the single strands, and extension of the primers annealed. The extension reaction will be performed at a temperature where the polymerase is active. In some embodiments, a thermostable and thermoactive polymerase is used. The double strands formed are separated by denaturation as indicated above.

This process can be performed using an instrument according to the invention. For this, the sample containing the nucleic acids is contained in a chamber of a device inserted or to be inserted into the instrument according to the invention as an object for getting cooled and heated.

A first component of an instrument according to the present invention is at least one substantially flat temperature sensor element. Substantially flat in this connection means that the sensor contains a surface not raising above its average environment by more than 1 mm, for example, not raising above its average environment by more than 0.1 mm. This has the advantage of good thermal contact of the surface of said device to be heated to the sensor element and the adjacent layers. It is designed to measure the temperature at the location where it is placed. Such elements are well known to those skilled in the art, and can be resistance elements. Useful sensors are between 0.01 µm and 10 µm, for example, between 0.8 µm and 1.2 µm, thick. An exemplary, commercially available sensor element is 1 µm thick and is available from companies such as Heraeus Sensor Technology (Kleinostheim, Germany), JUMO GmbH & Co. KG (Fulda, Germany) or Innovative Sensor Technology IST AG (Wattwil, Switzerland). The elements have connectors for permanently or reversibly connecting the sensor element to wires leading to a controlling unit. The sensor element can be manufactured according to known methods. It can be produced independently and thereafter closely fixed to the other components by known means, for example gluing. The sensor element can be made by sputtering a layer of the material to the accompanying layer. Such methods to apply thin layers are also known. Exemplary materials for the sensor element include nickel and platinum. In some embodiments, the sensor element is made from platinum or mixtures of platinum with other noble metals.

In some embodiments, the temperature sensor element is protected against mechanical and chemical destruction by a cover layer. This cover layer can be made from glass and can be between 1 µm and 25 µm thick. In some embodiments, it is produced by thick film deposition well known in the art. In addition, the layer can have a low electric conductivity and high thermal conductivity.

The temperature sensor element is optionally designed to adequately correlate with the temperature in the sample. This can be achieved by designing the shape of the element such that it closely resembles the shape of the device containing the sample. In some embodiments, the contact surfaces of the sensor element including the protective cover and the contact surface of the device are in close contact. Due to the defined arrangement of the instrument and the device, the temperature in the sample can be extrapolated with high certainty from the temperature measured in the sensor element.

The result of the temperature measurement is used for controlling the heating and cooling process in the instrument.

The second component of the instrument according to the invention is the heat conducting substrate. This substrate is optionally constructed from materials having a coefficient of thermal conductivity of between $2 \times 10^3$ and $5 \times 10^6$ W/m²K. Furthermore, said substrate is flat and can have a thickness of less than 0.1 and 10 mm, for example, between 1 and 5 mm. The substrate can have the characteristic to be rigid, i.e., stable to substantial mechanical distortion. Furthermore, the heat conducting substrate can be made of an electrically isolating material having an electric conductivity of less than 0.1 $\Omega^{-1}m^{-1}$. In addition, the substrate property optionally has a low thermal time constant (density×heat capacity/thermal conductivity), for example, of less than $10^5$ s/m². Appropriate materials are selected from the group consisting of alumina, copper, aluminum oxide, aluminum nitride, silicon nitride, silicon carbide, sapphire, copper, silver, gold, molybdenum and brass. In some embodiments, materials with a low electric conductivity are used, e.g., electrically isolating materials, such as materials having an electric conductivity below $10^{-9}$ $\Omega^{-1}m^{-1}$. Useful materials include ceramic materials, such as aluminum oxide, aluminum nitride, silicon nitride, silicon carbide and sapphire.

This substrate can also be manufactured according to known methods. In some embodiments, the substrate is manufactured by sintering of ceramics. The substrate may be prepared in a re-useable form, for example, resembling the shape of the substrate, or may be cleaved into pieces of appropriate dimensions after the sinter process.

The present invention requires that the substrate comprises one or more channels. The channel(s) can be located at any position in and on the substrate. In a first embodiment, the channels are formed within the substrate, such that the side walls of the channel(s) are completely covered by the material making up the substrate. The channels reach the surface of the substrate at positions designed as inlet and outlet for the cooling fluid. This embodiment requires careful manufacturing to ensure that the channel(s) enable fluid flow, but on the other hand do not leak. In another embodiment, the channels are formed as grooves in the surface of the substrate, and are covered by a layer of material of another layer. This material can be the same as the material of the substrate, but may also be different. The grooves are carefully closed to ensure that the fluid cannot leak from the channel into the environment other than at the defined inlet and outlet ports for the fluid. The closing of the grooves may be achieved by direct bonding of two parts of the same material or by using an additional thin adhesive. These two methods are well known in the art. The embodiment of the invention comprising grooves in the surface of the substrate may again have two possible embodiments. In a first embodiment, the grooves are located on the surface of the substrate pointing towards the sensor element. In one embodiment, the grooves are located on the surface of the substrate pointing towards the heater layer.

The dimensions of the channel(s) will depend on the cooling capacity desired and on the cooling fluid used. In some embodiments, the channels have a cross section of between 0.2 mm² and 4 mm², for example, between 0.5 mm² and 2.5 mm². The cross section may have any shape allowing quick fluid flow through the channel. In some embodiments, the cross section may be circular, oval or may have a rectangular, square or trapezoid diameter. The cross section may be the same over the full length of the channel, or may be different and changing over the full length of the channel. In some embodiments, the diameter is substantially identical over the full length of the channel within the substrate. The channel(s)

may be as long as required to cool the substrate as efficiently as desired. It will be understood, that a higher amount of shorter channels may be more efficient than a smaller amount of longer channels. The channels may be arranged in the substrate such as to evenly cool the substrate as required. For instance, they may be arranged juxtaposed to each other, each inlet port being at a distal end of the substrate. The geometry of the channel may be adapted to the size and shape of the substrate and/or the device to be cooled. In some embodiments, the geometry is a serpentine geometry. The channel(s) may be straight or may be bended or even may be bifurcated or divided into more paths on their way through the substrate.

The fluid used for cooling the substrate may be any fluid having substantial heat capacity. Exemplary fluids include water or air, but any other heat transfer media may be used.

To be able to introduce the cooling fluid into the channel(s), the device optionally has an inlet and an outlet port at the end of the channel(s). The ports usually have fittings to receive a tube leading from or to a supply of fluid. The fluid can be introduced into the channels by applying a pressure differential to the channel. This can be done by applying the cooling fluid under pressure to the inlet port of the channel(s), or/and providing a lower pressure or a vacuum to the outlet port of the channel.

The fluid supply may be a part of the instrument of the present invention and in some embodiments is a reservoir of cold fluid. Conveniently, the reservoir comprises a cooler unit, leading heat from the fluid to the environment. Any unit suitable for cooling the fluid may be used, for example, coolers similar to a refrigerator. The cooler may be controlled by a PC to bring the fluid to and keep the fluid at a temperature as required to cool the substrate. The cooling fluid when escaping the substrate may be lead back to the reservoir to again be cooled down and be reused to cool the substrate. In order to force the fluid through the channels, the instrument optionally comprises a motor to pump the fluid through the channel(s). Again, the motor may be controlled by a computer in order to cool the substrate to the required temperature, using a fluid of a given heat capacity, a defined temperature and a defined flow rate, depending upon the viscosity of the fluid and the heat to be removed from the substrate. The temperature of the cooling fluid may be chosen form the range of 4 to 35° C., for example, between 15 and 27° C.

The substrate, including the channel(s) may be separated from the adjacent layer, e.g., the heater layer, by a protective cover layer. Such a protective cover layer may be made from glass, glass ceramics or polymer compounds.

The third component of the instrument of the invention is the heater. The heater can be substantially flat, and is optionally a resistance heater. Such heaters are generally known in the art. In some embodiments, the heater is a layer of material with a high electrical resistance, e.g., selected from the group consisting of ruthenium oxide, silver, gold, platinum, copper, palladium and other metals. In some embodiments, the material is ruthenium oxide. The layer can have a thickness of between 10 μm and 30 μm, for example, between 15 μm and 20 μm. The heater can have a heating intensity of between 15 and 40 W/cm$^2$.

The heating layer is optionally prepared by coating or screen printing a paste of the material in particular form and heating said composite to a temperature sufficient for the particular material to sinter. In some embodiments, the material thereby adheres to the layer on which it is sintered.

The heater according to this invention optionally is a resistive heater. Resistance heating uses the effect that the resistance of small diameter wires upon current flow leads to a loss of energy by heat. In one embodiment, the design is a heating coil with a defined resistance for resistive heating. The coil can be formed by a wire or it can be designed in another way, e.g., on a printed circuit board or as conductor of any kind of material on a substrate like ceramic or polyimide. One other option is that the coil is formed by thin or thick film technology on a suitable substrate. The coil can be located below, on top or at the sides of the receptacle or even surround the device in a way that the device is inside the coil depending on the design of the coil.

The different layers of the instrument described above can be located in close contact to each other to allow efficient heat flow from and to the object. In some embodiments, the cooling capacity is substantially higher than the heating capacity.

A device as used with an instrument and/or the methods according to the invention is a container for keeping the mixture comprising the sample under the conditions of the method. Thus, the device should be heat resistant to the amount and to the kind of heat provided to the mixture, be resistant to the reagents contained in the mixture and be tight so that the mixture cannot escape the container.

In FIG. 1 the components of an exemplary system in assembled form including additional features are shown. The device comprising a chamber (6) in a body (7) closed with a heat conductive sealing foil (5) contains the sample. It is located in close proximity to the temperature sensor element (1). The sensor element (1) separates the substrate (2) from the device. The substrate comprises fluid channels (4) allowing fluid to be conveyed through the channels in order to substantially lower the temperature of the substrate. Finally, the instrument further comprises a heater layer (3) in order to allow raising the temperature of the substrate.

Figure 2:
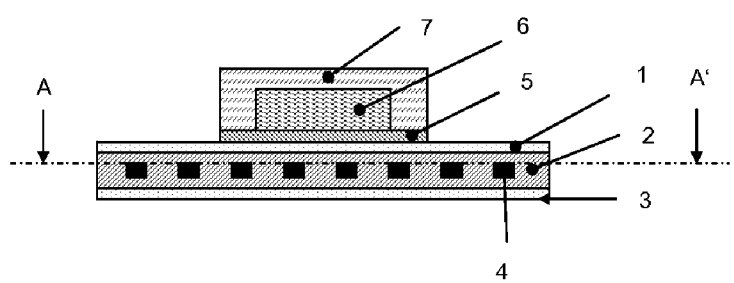
FIG. 2 displays the top views of the fluid channels at a cross section A-A' through the substrate of an instrument according to the invention in an arrangement for homogenous cooling and in an arrangement for focused cooling.
Figure 2:
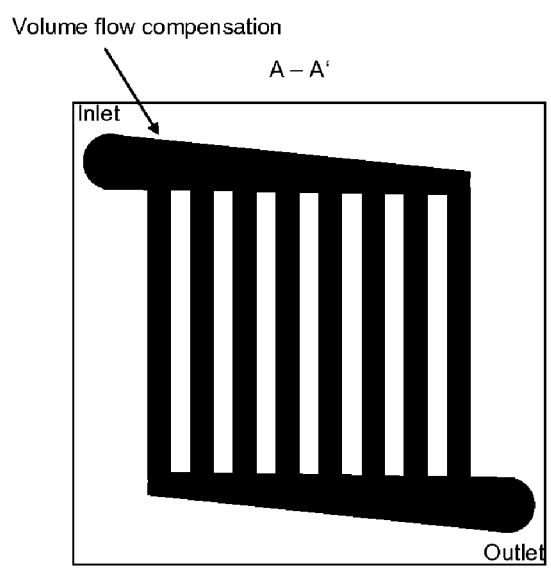
Figure 2:
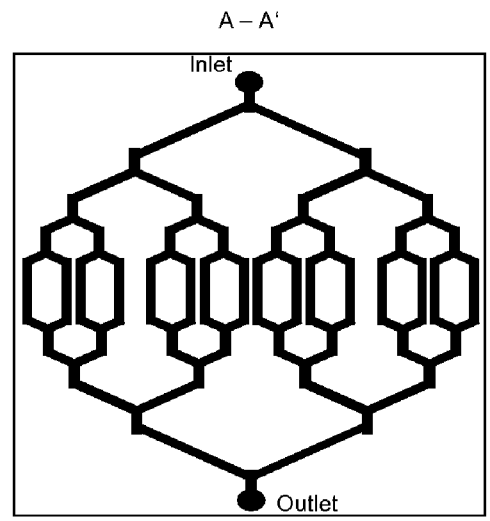

In FIG. 2 the top views of the fluid channels (4) at a cross section A-A' through the substrate (2) of an instrument according to the invention are displayed. The fluid channels may be arranged in parallel allowing for homogenous cooling of the entire substrate. In another arrangement for focused cooling a particular area or various particular areas of the substrate in the vicinity of the fluidic channels are cooled. In both exemplified arrangements of the fluid channels the fluid is introduced at the inlet port and escapes the fluid channels at the outlet port.

The use of the instrument according to the invention optionally includes an efficient control of temperature to ensure performance of a temperature profile, for example, of repeated temperature cycles as useful for thermocycling, e.g., in PCR. The temperature and heat control can include:

measuring the temperature of said sample in the device using the sensor element, comparing the temperature measured with the temperature intended to be reached in sample, and applying heat to the sample through the heater element to either raise the temperature, if the temperature of the sample is lower than the temperature desired, or maintain the temperature in said sample, if the temperature of the sample is the same as the temperature desired.

In one mode, therefore, the present invention comprises controlling and regulating the heating process by a computer program dependent upon the temperature of the liquid. The unit used for control of the heater is called the heat control.

Because of the flat sensor element the measurement of the temperature is very quick and does not need extensive electronics. The algorithms to compare the temperature measured with the temperature desired are also quite simple. Simple PID (proportional, integral, derivative) control algorithms known in the art are sufficient.

The heat can be applied through the heater in any known manner, e.g., by continuously applying electric current to the resistance heater or introducing said heat in pulses of electric current or using alternative current. Details of the length of said pulses or the amount of electric current for achieving a desired increase in temperature can be determined in simple experiments by determining the temperature in an exemplary sample and varying the amount of current and/or the length of the pulses at a given cooling capacity.

In some embodiments, this is done by using a control unit comprised in the instrument, receiving the temperature measurement values from the sensor and instructing the heater not to heat, or to heat continuously or in intervals until the temperature desired is reached. In more detail, the temperature in the liquid can be determined using the measurement with the temperature sensor in contact with the device containing the sample and knowing the physical conditions of the interaction. To control the desired temperature profile in the liquid over time the PID control algorithm will set the required heating/cooling power to achieve the proper temperature at the desired point in time taking into account also the desired temperature and the measured temperature at the least time interval. The temperature sensor in contact with the device containing the sample will measure the temperature in a known manner, i.e., proportionally to the designed lateral temperature intensity distribution over the whole contact surface with respect to the sensor in contact with the device. If a lower temperature than expected is measured at the sensor in contact with the device then the mechanical contact between the instrument and the device is considered to be insufficient. If the measured and the expected temperatures correlate to each other the mechanical contact is considered to be within working conditions. In another embodiment a second sensor element may be used to determine the temperature in the sample and to evaluate the contact between the instrument and the device. In this case the measured temperature resolution is doubled compared to embodiments using only one sensor and the risk of getting inappropriate temperatures within the sample is lowered significantly.

Another embodiment of the invention is a method for conducting a thermal profile in an object comprising heating and cooling the object in an instrument according to the invention.

A thermal profile is a sequence of temperatures to be reached in the sample. In some embodiments, all temperatures of said profile are located above room temperature, for example, between 37 and 98° C., or between 40 and 96° C. The profile may be a rising profile, wherein the temperatures are raised over time, or may be a descending profile, wherein the temperatures are lowered over time. In one embodiment, the thermal profile is a profile having maximum and minimum temperatures, i.e., with temperatures rising and dropping. In one embodiment of the invention, said thermal profile contains repeated thermocycles as needed for performing PCR. Those thermocycles will include a maximum temperature allowing denaturation of double stranded nucleic acids into single strands and a minimum temperature allowing annealing of single stranded nucleic acids to double strands.

In some embodiments, the method according to the invention further comprises cooling said device. Herein, cooling can be made by subjecting said instrument, for example, the channel(s) contained in the substrate via its inlet port(s) to a stream of a fluid, for example, a gas (e.g., air) so that it passes the channel(s). The amount of fluid and its temperature will determine the speed of cooling. If the cooling capacity is large enough, the cooling process can be performed even when heat is still applied to the instrument by said heater. By locating the heater on the side of the substrate pointing away from the object to be heated/cooled, the heat produced by the heater during cooling the object will not be sufficient to substantially reduce the efficiency of the cooling process. As soon as cooling is stopped, e.g., by slowing down or stopping the flow of the cooling fluid or by passing a fluid of higher temperature through the channel(s), the heat produced in the heater will not be lead away by the fluid, thus allowing heating of the object.

As outlined above, heating of the object is done by operating the heater, e.g., by passing electrical current through a resistance heater. Cooling is done by passing the cooling fluid through the channel(s). The heating and cooling process is performed sufficiently long for the object to assume the temperature as intended, and longer, if the temperature is to be kept constant over some period of time. The periods of heating, cooling or maintaining the temperature may be chosen as long as required for the application, e.g., for PCR. The amount of time used for heating, cooling and maintaining may be controlled by the temperature sensor in combination with a computer unit to direct initiating of heating and cooling processes and their intensity, dependent upon amount of current and fluid. The sensor may be used to measure the temperature in the object. The computer may be used to determine whether the temperature in the object is identical to the temperature of the profile to be followed.

Another embodiment of the invention is a system for determining a nucleic acid in a sample comprising an instrument according to the invention and a device containing said sample or designed for receiving said sample. This system may be used in the methods for amplifying nucleic acids according to the invention. A system therefore conveniently comprises reagents and consumables for conducting the amplification and determination, and optionally may be automated by inclusion of robotics for handling the device and/or the sample. In the system, the device may be inserted to ensure proper application of electric current and cooling capacity to the components of the instrument and finally heating and cooling the device contained in the active position.

Another embodiment of the invention is a method for amplification of nucleic acids comprising providing a mixture of a liquid containing said nucleic acids and amplification reagents in a device in an instrument according to the invention and subjecting said mixture in said device to thermocycles.

The following examples are offered to illustrate, but not to limit the claimed invention.

EXAMPLES

Example 1

Manufacturing an Instrument According to the Invention

In a first step a flat and a patterned ceramic wafer is produced. The flat ceramic wafer can be ordered in various standard thicknesses from the company CeramTec AG (Plochingen, Germany). As used herein, it is made from aluminum oxide and has a thickness of 635 μm. The patterned ceramic wafer containing the fluidic channels, i.e., open channels on one side, is molded by ceramic injection molding techniques well known in the art. The two ceramic plates are brought into contact and fused together by a further sintering step. In the next step the thin film temperature sensors made from platinum available from the company Heraeus are coated on one of the large surfaces of the ceramic bulk and protected by a cover layer made up from glass and having a thickness of 20 µm. The thin film sensors may also be used as heaters. In a further manufacturing step the thick film heater (material: ruthenium oxide, thickness 15 µm) is manufactured on the opposite side of the ceramic bulk. The thick film layer is also protected by a cover layer made up from glass and having a thickness of 20 µm.

Example 2

Conducting a PCR Using the Instrument According to the Invention

Figure 3:
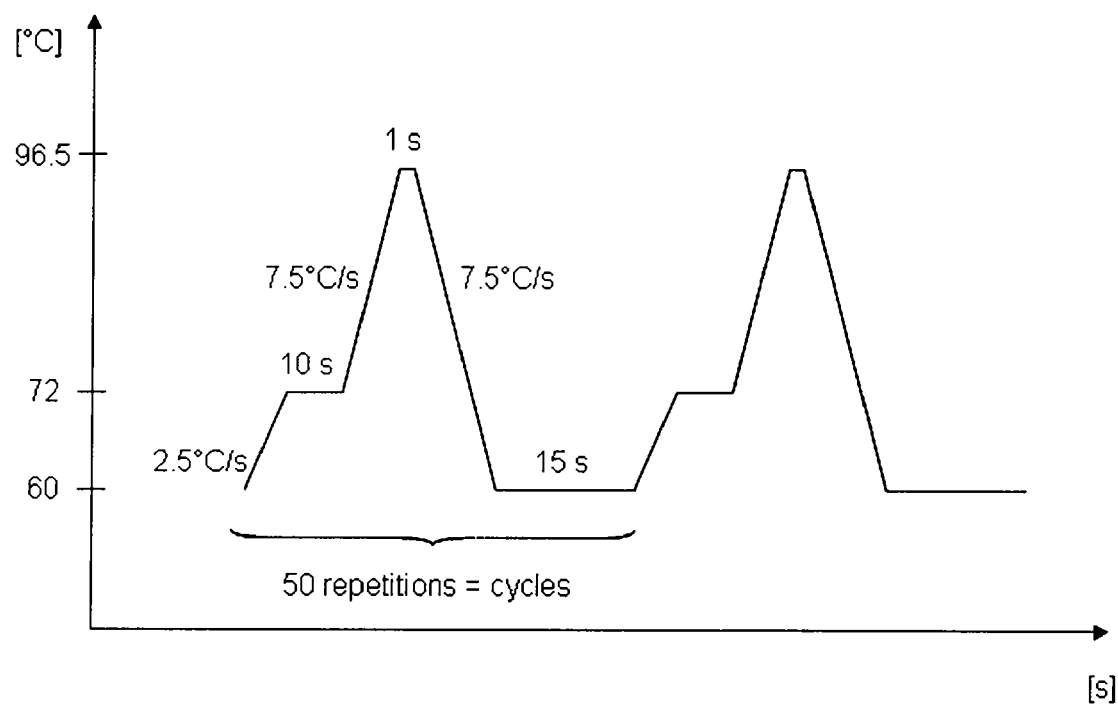
FIG. 3 depicts a temperature profile set on the instrument in order to generate the PCR curve.

Using the thermal cycler described in example 1, several PCR runs were performed using the commercially available LightCycler ParvoB19 Kit (Cat No 3 246 809, Roche Diagnostics GmbH, Germany) for real-time PCR detection, following the instructions of the manufacturer provided in the kit and using LightCycler Parvo B 19 Standard as the template. The temperature profile as shown in FIG. 3 was set to generate the PCR curve. The temperature slopes were chosen in the way that the PCR efficiency is still good, whereas the thermal cycler could manage much faster slopes, e.g., 20° C./s.

Figure 4:
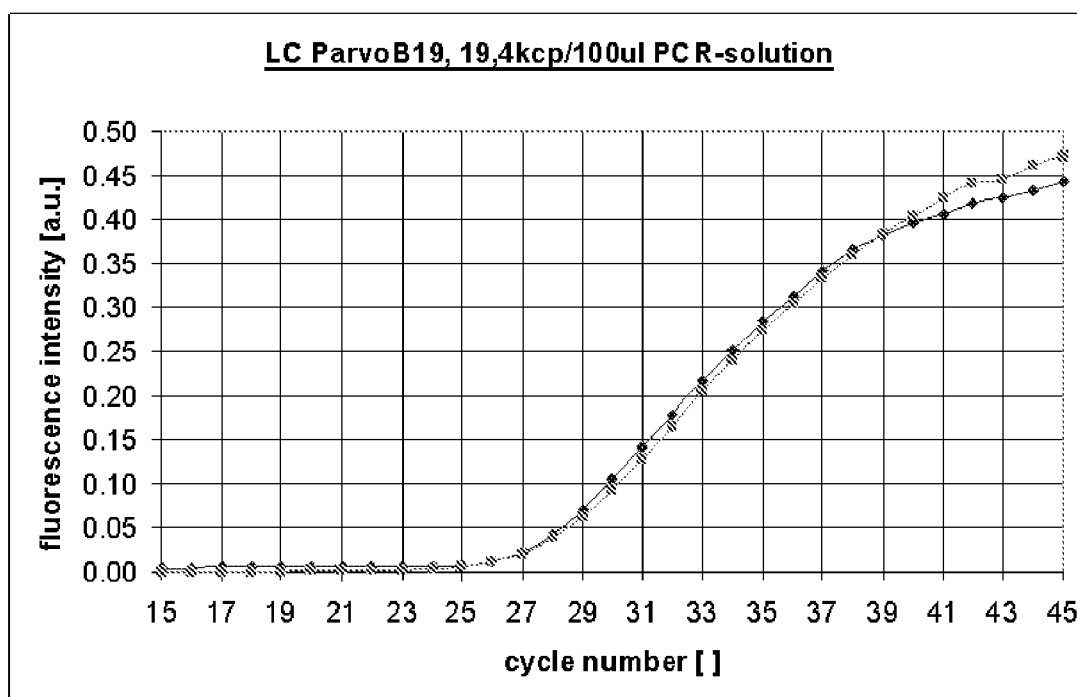
FIG. 4 shows the results of two experiments performed with an instrument according to the invention in graphic form.

The results in graphic form—measured on a breadboard with the described thermal cycler using the described temperature sensors and using a breadboard real-time fluorescence photometer capable of exciting and measuring the fluorescent substances described in the LightCycler ParvoB19 Kit (Roche Diagnostics GmbH, Germany)—for two experiments are shown in FIG. 4.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An instrument for heating and cooling an object in a controlled manner, said instrument comprising layered on top of another in the following order from top to bottom
   at least one substantially flat temperature sensor element,
   a heat conducting substrate, and
   a heater layer,
   wherein said heat conducting substrate comprises one or more channels permeable for a fluid.

2. The instrument of claim 1 wherein said sensor element comprises a resistance element and a cover layer, said cover layer protecting said resistance element from direct contact with the environment and having a thickness of less than 25 µm.

3. The instrument of claim 2, wherein said cover layer has an object contact surface reflecting a surface shape of said object and pointing towards a sensor contact surface of said object.

4. The instrument according to claim 1, wherein said sensor element is between 0.01 µm and 10 µm.

5. The instrument according to claim 1, wherein said substrate has a thickness of between 1 mm and 10 mm.

6. The instrument according to claim 1, wherein said heat conducting substrate is made of an electrically isolating material.

7. The instrument according to claim 1, wherein said heater has a thickness of less than 30 µm.

8. The instrument according to claim 1, further comprising a heat control.

9. The instrument according to claim 1, further comprising a reservoir of fluid having a temperature of less than 35° C.

10. A method for conducting a thermal profile in a device comprising heating the device in an instrument according to claim 1.

11. The method according to claim 10 further comprising passing a cooling fluid through the channels of said substrate of said device.

12. The method according to claim 10, wherein said fluid is a gas.

13. The method according to claim 10, wherein said fluid is a liquid.

14. The method according to claim 10, wherein said thermal profile contains repeated thermocycles.

15. A system for determining a nucleic acid in a sample comprising an instrument according to claim 1 and a device containing said sample, wherein said instrument is in physical contact with said device during the determination of said nucleic acid in said sample.

16. A method for amplification of nucleic acids comprising:
   a) providing a sample containing the nucleic acids in a device,
   b) bringing said device in physical contact with an instrument according to claim 1, and
   c) subjecting said sample in said device to thermocycles.

17. A system for heating a mixture comprising:
   a device containing one or more chambers for containing the mixture and
   an instrument according to claim 1,
   wherein said device is in physical contact with said instrument during heating said mixture.

* * * * *